Figure 1:
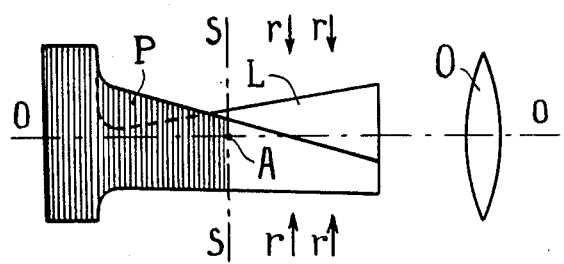

United States Patent

[11] 3,588,256

| [72] | Inventor | Piero Derossi<br>55 Corso Giovanni Lanza, Turin, Italy |
|---|---|---|
| [21] | Appl. No. | 823,573 |
| [22] | Filed | May 12, 1969 |
| [45] | Patented | June 28, 1971 |
| [32] | Priority | June 12, 1968 |
| [33] | | Italy |
| [31] | | 52,015-A/68 |

[54] OPTICAL PROFILE PROJECTOR
4 Claims, 4 Drawing Figs.

[52] U.S. Cl. .................................................. 356/164,
353/80
[51] Int. Cl. ........................................................ G01b 9/08
[50] Field of Search ............................................. 356/164-
—8; 353/80

[56] References Cited
UNITED STATES PATENTS

| 2,629,936 | 3/1953 | Cronstedt | 356/167 |
| 2,724,987 | 11/1955 | Reason et al. | 356/166 |
| 2,737,080 | 3/1956 | Mottu | 356/166 |
| 2,741,153 | 4/1956 | Reason et al. | 356/166 |
| 2,947,213 | 8/1960 | Oddie | 356/164 |
| 2,958,255 | 11/1960 | Dietrich | 356/166 |

FOREIGN PATENTS

| 646,508 | 11/1950 | Great Britain | 356/165 |
| 704,267 | 1954 | Great Britain | 356/165 |
| 533,350 | 1956 | Canada | 356/165 |
| 1,054,238 | 1953 | France | 356/165 |
| 615,262 | 1961 | Italy | 356/165 |
| 922,391 | 1963 | Great Britain | 356/154 |
| 843,175 | 1952 | Germany | 356/164 |

*Primary Examiner*—Ronald L. Wibert
*Assistant Examiner*—J. Rothenberg
*Attorney*—Young and Thompson ABSTRACT: An optical comparator for projecting on a screen the sections of a workpiece, for checking and comparison purposes, wherein the structure supporting the projected workpiece is pivotally connected to the fixed structure of the projector, and may be oscillated within certain limits for suppressing masking when this occurs in the projection.

PATENTED JUN28 1971 3,588,256

INVENTOR

PIERO DEROSSI

BY Young + Thompson

ATTORNEYS

OPTICAL PROFILE PROJECTOR

This invention relates to optical comparators of the type wherein a section of a workpiece is projected through an objective on a screen. The projected section results from the intersection of the workpiece to be tested with the plane (separating a dark space from a lighted space) determined by flat rays of light directed from suitable light sources toward said workpiece.

Such optical comparators are employed for several purposes, and particularly for checking or testing the blades of fluid-dynamic machines (turbines, pumps, compressors and the like), by comparing their projected sections with the corresponding theoretical sections, represented by drawings which are thrown on the projection screen.

Should the tested workpiece be twisted (which happens particularly when blades for fluid-dynamic machines are projected), so that each section is somewhat rotated with respect to the preceding one, the longitudinal profiles of the body have a certain inclination with respect to the optical axis of the projection objective. When such inclination exceeds certain limits depending on the objective characteristics and particularly on the objective aperture, some portions of the tested workpiece, lying between the projected section and the objective, may cut off a portion of the rays coming from the section which is of interest, thereby hindering its projection. This phenomenon, called masking, may be avoided in some cases by increasing the aperture of the objective and making use of some special constructions of the same, but the steps taken for the purpose are limited for technical and economical reasons.

The object of this invention is to avoid this cut off of rays in optical comparators of the above-mentioned type, without applying expensive and rather complicated measures of an optical kind, but rather through a mechanical expedient and without increasing in a substantial manner the cost of the equipment.

Figure 2:
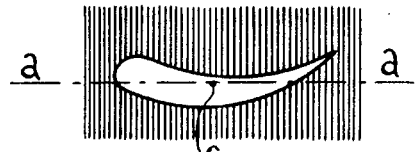
Figure 3:
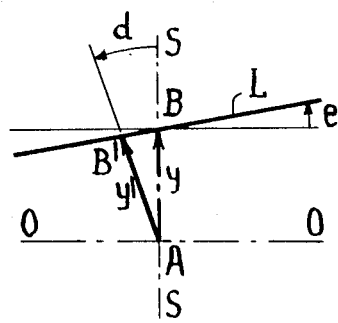
Figure 4:
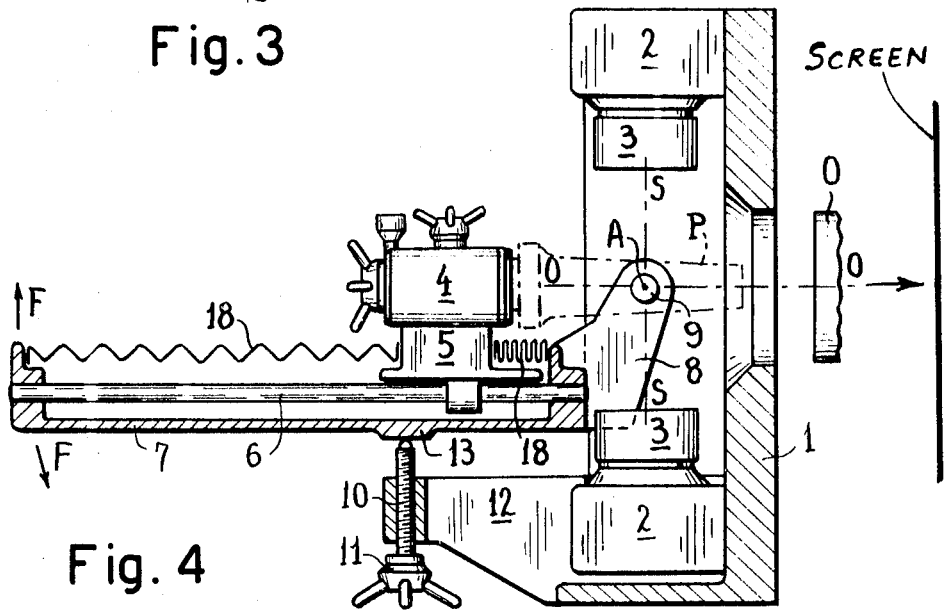

Specifically, it has been discovered that a slight inclination imparted to the projected section due to pivoting it about a suitable selected axis, introduces in the projected image an extremely reduced error, which may be included in the permissible tolerances. The inventive idea consists therefore in providing the optical comparator, and especially its workpiece holder, with suitable means which allow pivoting the tested workpiece through a limited angle about an axis intersecting the optical axis of the objective and lying in the plane of the projected section, whereby when masking occurs said workpiece may be pivoted a certain angle in order to restore the projection of the whole section considered. The invention will be explained more in detail in the following specification, with reference to an exemplificative but not limitative embodiment, diagrammatically shown in the accompanying drawing, wherein:

FIG. 1 diagrammatically shows a side view of a twisted turbine blade in projection position;

FIG. 2 diagrammatically shows the image projected on the screen, wherein the axis chosen for the blade oscillation according to the invention is indicated;

FIG. 3 diagrammatically shows the geometrical relation between the projected image and the true tested section in the case of an inclination of the blade;

FIG. 4 shows a diagrammatic longitudinal section of a portion of an optical comparator provided with means for pivoting the piece to be tested, according to the invention.

As shown in FIG. 1, when a turbine blade P, having a considerable twist (which has been exaggerated in the FIG. in order to put it more in evidence) has been placed with its longitudinal axis along the optical axis $o-o$ of the objective O of an optical comparator, it has its longitudinal profiles (for example L) substantially inclined with respect to said optical axis, and will therefore in some cases with a given objective, give rise to masking. The section of the blade P lying on the plane $s-s$ which separates a dark space (to the left in the FIG.) from a space illuminated by flat rays of light radially inwardly directed from suitable light sources toward the object, which section ought to be projected on the screen substantially as shown in FIG. 2, is on the contrary not correctly projected, i.e. a portion of its contour appears as uncertain.

According to the invention when masking occurs the blade P is slightly pivoted about an axis $a-a$ lying in the plane $s-s$ and intersecting at A the optical axis $o-o$ of the objective. As shown in FIG. 2, the axis $a-a$ is preferably chosen parallel to the geometrical chord of the section and passing through the center C of the tested section. All above conditions defining the axis $a-a$ and categorically specified in order to state the most favorable position of axis $a-a$, do not require to be maintained very strictly in practice, but only approximatively with quite large tolerances.

Considering a point B in the plane $s-s$ and on the longitudinal profile L (FIG. 3), said profile forming an angle $e$ with the optical axis $o-o$, and imagining to have pivoted the tested workpiece about the axis $a-a$ passing through the point A (crossing point of $s-s$ and $o-o$), by an angle $d$ sufficient to avoid cut off of rays and making possible thereby the projection of the concerned section, it will be evident that instead of the point B, the point B' will be projected, said point B' having from the point A, a distance $y'$ instead of $y$. In general $y'$ is different from $y$ and therefore such pivoting will introduce an error into the projection. The distance $y'$ may however by expressed as a function of $y$, and taking into due account the approximations allowed by the very small size of the angles $e$ and $d$, the following expression may be obtained:

$$y^1 = \frac{y}{\cos d} - yed = y\left(1 + \frac{d^2}{2} - ed\right)$$

It appears therefrom that for angles $e$ and $d$ limited to a few hundredths of a radian, $y'$ differs at most by a few units per thousand from $y$, representing therefore most acceptable approximation. It must be noted that such estimation is made for the point placed in the most unfavorable conditions, thus corresponding to a maximum error to which it is not necessary to come near. In fact, according both to the above expressed formula and to FIG. 3, the error is null (assuming rectilinearity of the L profile) if it is assumed $d=2e$, which may be done at least as an approximation.

An optical comparator according to the invention comprises in its construction a fixed structure 1, carrying the lamp housing 2 with objectives 3 for generating the flat light rays used for illuminating the blade P in a well-known manner. The blade P (or other workpiece to be tested) is carried, also in a known manner, by a workpiece holder 4 supported by a carriage 5 sliding on a guide 6. Said guide is carried by a structure 7 and protected by flexible bellows 18. In the known constructions, the structure 7 is fixed to or integral with the structure 1.

According to the invention, the structure 7 ion the contrary provided with ears 8, by means of which and of pivots 9 it is pivotally mounted on the structure 1, so that it may be pivoted with respect to said structure in the direction of arrows F, by rotating about the axis of the pivots 9 which is located approximately in the plane $s-s$, i.e. the plane of the tested section defined through the flat light rays of the illuminating devices 2, 3, said axis passing through the point A and further intersecting (or at least crossing near by) the optical axis $o-o$ of the projecting objective O. The workpiece P to be tested is then mounted on the workpiece holder 4 in such a way that the longitudinal axis of the workpiece may coincide at least approximately with the optical axis $o-o$ and that the mean chord of its sections may be at least approximately parallel to the axis of the pivots 9.

In order to hold the tested workpiece P in its original position or to pivot it as required about the pivots 9, operating and clamping means of any kind may be provided for the movable structure 7, for example as illustrated by a screw 10 with a hand grip 11. Said screw is threaded in a fixed tailpiece 12 of the fixed structure 1, and cooperates with a corresponding portion 13 of the movable structure 7. Instead of a screw 10, cams, levers or other operating means may be employed if desired with appropriate locking means (not shown).

While checking the sections wherein masking occurs, the inclination of the tested workpiece P will be regulated until making has disappeared along the whole contour, when possible; otherwise, any single portion of the projected profile may be checked separately, choosing each time an inclination of said workpiece P such as to allow correct projection of the portion involved, even if when doing so masking should remain or even should appear in other portions of the same section.

It is to be noted that, if the above specified conditions for the choice of the pivoting axis are observed with a sufficient approximation, the pivoting of the tested workpiece will not cause any displacement at all of the section image projected on the screen, said image remaining always in a position suitable for comparison with the corresponding drawing applied on the screen.

I claim:

1. In an optical comparator comprising a first structure, illumination means carried by said first structure for generating flat light rays defining a sectional plane, a screen, a projection objective having its optical axis perpendicular to said sectional plane and to said screen for focusing on said screen the image of said sectional plane, and a second structure comprising a workpiece holder for supporting a workpiece to be tested with the longitudinal axis of said workpiece lying substantially along the optical axis of said objective, and supporting and guiding means for said workpiece holder; the improvement comprising pivot means connecting said second structure to said first structure, with the axis of said pivot means lying at least approximately in said sectional plane defined by the plate light rays and crossing at least nearby the optical axis of said projection objective, whereby said second structure with the carried workpiece may be pivoted in order to restore the correct projection when a portion of the tested workpiece cuts off a portion of the projected light rays.

2. An optical comparator as set forth in claim 1, wherein said pivot axis is substantially parallel to the mean chord of the projected profiles of the tested workpiece and passes nearby the geometrical center of the projected section of the tested workpiece.

3. An optical comparator as set forth in claim 1, wherein said second structure comprises side ears integral with said second structure and said first structure comprises pivots coupled with said side ears.

4. An optical comparator as set forth in claim 1, further comprising a tailpiece integral with said first structure, a screw threaded in said tailpiece, said screw cooperating with the second structure, and a hand grip on said screw for its operation.